INVENTORS:
PHILIP BARKAN,
ALLAN N. GREENWOOD,
BY William Freedman
ATTORNEY

United States Patent Office 3,548,256
Patented Dec. 15, 1970

3,548,256
HIGH VOLTAGE D-C CIRCUIT BREAKER
Philip Barkan and Allan N. Greenwood, Media, Pa., assignors to General Electric Company, a corporation of New York
Filed July 5, 1968, Ser. No. 742,825
Int. Cl. H02h 3/00, 7/00
U.S. Cl. 317—11                                                12 Claims

ABSTRACT OF THE DISCLOSURE

A high-voltage direct-current circuit breaker of the type in which a current zero is created by discharging a commutating capacitor through a circuit-interrupting device. The capacitor is normally maintained charged with a given polarity by current derived from the D-C circuit. When the circuit breaker is to be operated, this polarity is reversed by discharging the capacitor through the closed contacts of the interrupting device and interrupting the oscillatory discharge current upon its reaching zero. Thereafter, the interrupter's contacts are rapidly separated. The capacitor is then discharged again, this time driving to zero the D-C current through the contacts.

---

This invention relates to an electric circuit breaker for interrupting a high voltage direct current circuit and, more particularly, relates to a circuit breaker of this type in which a current zero is created by discharging a commutating capacitor through a circuit interrupting device.

In the particular circuit breaker that we are concerned with, a circuit interrupting unit, hereinafter referred to as an interrupter, is connected in series with a high voltage direct current circuit that supplies current through the interrupter to a load. Connected across the interrupter is a normally-open commutating circuit that includes a charged commutating capacitor. When the D-C circuit is to be opened, the capacitor is caused to discharge through the interrupter and the commutating circuit. This discharge current is an oscillatory current that forces the current through the interrupter to zero, thus giving the interrupter an opportunity to build up dielectric strength and complete the interruption.

In circuit breakers of this type previously proposed for high voltage applications, a separate charging source has usually been provided for the commutating capacitor. Such a separate charging source can be quite expensive, and efforts have been made to eliminate this expense by charging the capacitor directly from the power circuit. Application S.N. 533,366—Greenwood, now Pat. No. 3,435,288 filed Mar. 10, 1966, and assigned to the assignee of the present invention, shows and claims a charging arrangement which takes this approach.

While the charging arrangement of the above Greenwood application does permit charging to take place directly from the power circuit without the need for a separate charging source, it is subject to the disadvantage that the resulting circuit breaker is required to handle increased amounts of arcing current during interruption. In this respect, in the Greenwood arrangement, the first half-cycle of oscillatory discharge current is in the same direction as the D-C current to be interrupted. It is not until the second half-cycle of the oscillatory discharge current that the total current is driven to zero. Since prior to capacitor-discharge Greenwood's interrupter is operated to establish an arc carrying the D-C current, the first half-cycle of oscillatory discharge current increases the total arcing current to a value considerably higher than the D-C current. Typically, this peak value will be at least twice that of the D-C current being interrupted. Interruption is made more difficult by the presence of this high value of arcing current prior to current zero.

An object of our invention is to provide for charging the commutating capacitor directly from the power line without a separate charging source, yet without increasing the magnitude of the arcing current which must be carried by the interrupter prior to current zero.

Another object is to utilize the capacitor discharge current to help achieve a large portion of the full contact-separation extremely rapidly and before the instant of the first current zero in the current passing through the contacts.

In carrying out our invention in one form, we provide an interrupter comprising separable contacts for connection in series with the D.C. circuit to be interrupted. A normally-open commutating circuit is connected across said contacts and comprises normally-open circuit-making means and a commutating capacitor connected in series with each other when the circuit-making means is closed. The capacitor is connected to the D.C. circuit at the source side of the contacts even when the circuit-making means is open. Means operable both when the contacts are engaged and disengaged is provided for causing the capacitor to be charged from the D.C. circuit when the circuit-making means is open. Means is provided for closing the circuit-making means while the interrupter's contacts are still engaged to discharge the capacitor through said engaged contacts and the circuit-making means and to cause the capacitor to be charged with a polarity opposite its initial charge. The initial discharge current passes through the contacts in the same direction as the direct current in the D-C circuit. The capacitor discharge current through the circuit-making means is interrupted when it oscillates to zero. The interrupter's contacts are separated following said interruption. Means is provided for again closing the circuit-making means after the contacts have been separated a predetermined distance, thereby discharging the capacitor through the interrupter in an opposite direction to the direction of its initial discharge, thus driving the current through the D-C circuit to zero.

For a better understanding of the invention, reference may be had to the following description taken in conjunction with the accompanying drawings wherein.

Figure 1:
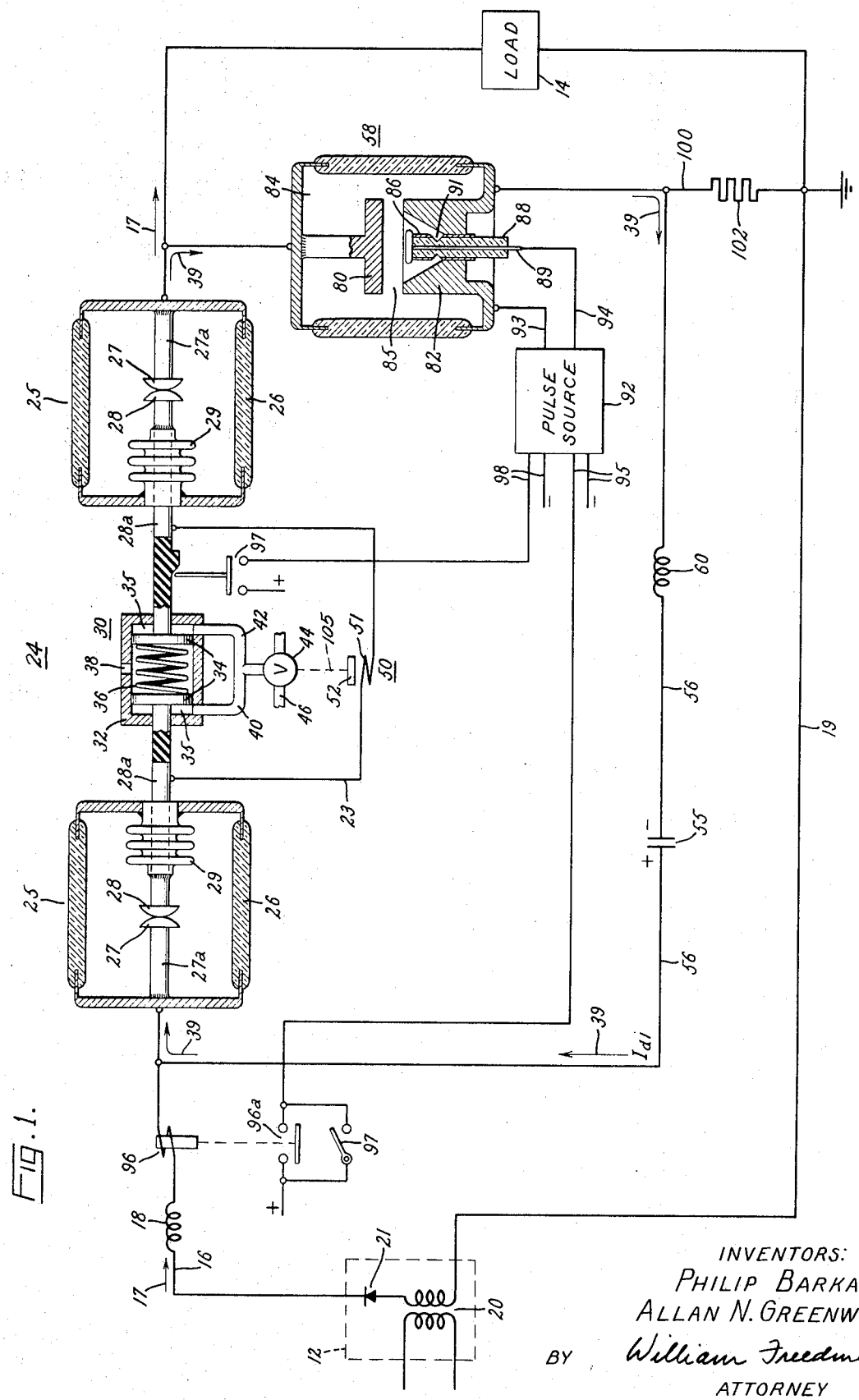
FIG. 1 is a schematic diagram of a high voltage D-C circuit breaker embodying one form of our invention.

Referring now to FIG. 1, there is schematically shown a high voltage D-C circuit comprising a source 12, a load 14, and a power line 16 for delivering power to the load from the source. It will be assumed that the normal load current flows in the direction indicated by arrows 17, returning to the source through return conductor 19. The source 12 is schematically shown as comprising a transformer 20 and a rectifier 21 connected in series with the secondary winding of the transformer.

For controlling the flow of current to the load 14, a circuit breaker 24 is connected in the power line in series with load 14 between source 12 and the load. The inductance of the power system on the source side of the interrupter is depicted at 18.

In a preferred form of the invention, the circuit breaker 24 comprises a plurality of vacuum-type circuit interrupters 25 connected in series through a conductor 23. Each interrupter comprises a highly evacuated envelope 26, partially of insulating material, and a pair of relatively movable contacts 27 and 28 disposed within the evacuated envelope 26. One of the contacts 27 is a stationary contact mounted on a conductive rod 27a extending through one end of the interrupter. The other contact 28 is a movable contact 28 that comprises a conductive rod 28a projecting through the other end of the envelope. A flexible metallic bellows 29 sealed at its opposite ends to the movable contact rod 28a and the envelope 26 permits the movable contact 28 to move horizontally without impairing the vacuum inside envelope 26.

Each of the vacuum circuit interrupters can be of a conventional form and is therefore shown in schematic form only. Examples of vacuum-type circuit interrupters suitable for this application are shown in more detail and claimed in U.S. Patents 2,949,520—Schneider and 3,089,936—Smith, both assigned to the assignee of the present invention.

For opening the two vacuum interrupters, an actuator 30 is disposed in a position between the interrupters. This actuator comprises a cylinder 32 and a pair of pistons 34 disposed within the cylinder and respectively coupled to the movable contact rod 28a of the two interrupters through suitable insulating structure. The movable contacts 28 of the two interrupters are normally held in the closed position by a closing spring 36, which is shown between the two pistons 34.

Opening of the interrupters is effected by supplying pressurized fluid to cylinder spaces 35 located at the outer sides of the two pistons 34, thereby driving the pistons toward each other against the opposition of spring 36. A suitable vent 38 in the cylinder wall between the pistons prevents any undesirable pressure build-up between the pistons. Pressurized fluid for opening is supplied to cylinder spaces 35 through supply lines 40 and 42, which are under the control of a three-way opening valve 44. This valve 44 preferably comprises a main valve and a pilot valve for controlling the main valve in a conventional manner (not shown). When the circuit breaker is closed, as shown in FIG. 1, valve 44 vents the chambers 35; but when valve 44 is operated, it connects lines 40 and 42 to high pressure supply line 46. Pressurized fluid thereupon flows through line 46, lines 40 and 42 into cylinder spaces 35, thereby driving the pistons 34 together to open the interrupters.

For controlling the opening control valve 44, a suitable electroresponsive control 50 is provided connected in series with the conductor 23. To facilitate an understanding of the invention, this control 50 is depicted in simplified schematic form as comprising a stationary coil 51 and a movable conductive disc 52 normally located immediately thereadjacent. The conductive disc is connected to a suitable control element of the valve 44. A rapid change in current through coil 51 induces a circulating current in the disc 52, and the magnetic fields from the two currents create an abruptly rising repulsive force that rapidly drives the movable disc 52 upwardly to operate control valve 44. Suitable seal-in means (not shown) is provided to hold the disc 52 in its operated position until intentionally reset. Normal D-C current through coil 51 induces little current in the disc 52, and suitable detent means (not shown) is provided for holding the disc 52 in its position of FIG. 1 during normal current conditions. The disc 52 is only operated in response to an abruptly-changing current through coil 51. An example of an actuator of this type is shown in U.S. Patents 3,378,727—Kesselring and 2,916,579—Kesselring et al.

To interrupt direct current, it is necessary first to force the current to zero and then to prevent arc-reignition. One way of forcing the current to zero is by forcing a locally-controlled current through the interrupter in opposition to the normal load current flowing therethrough. This is the general approach used in the illustrated interrupting arrangement, where the opposing current is derived from a commutating capacitor 55. As will soon be explained in more detail, capacitor 55 is precharged with the polarity shown in FIG. 1. The capacitor 55 is located in a commutating or arc-quenching circuit 56 that is connected across the interrupters 25. The commutating circuit 56 is normally maintained in an open condition by normally-open circuit-making means 58 connected in series with commutating capacitor 55 in circuit 56.

When circuit-making means 58 is closed, as will soon be explained, commutating capacitor 55 discharges through a loop circuit that comprises the series combination of the commutating circuit 56, contacts 27, 28 of one interrupter, conductor 23, the control element 50, contacts 27, 28 of the other interrupter, and circuit-making means 58. The capacitor discharge current $I_{d1}$ initially flows through this loop circuit in the direction illustrated by arrows 39.

Figure 2:
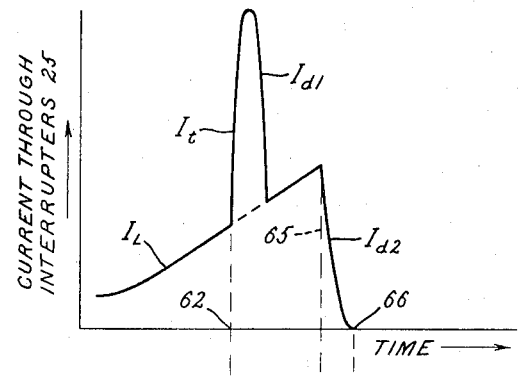
FIG. 2 is a graphic representation of certain current relationships present during the operation of our circuit breaker.
Figure 3:
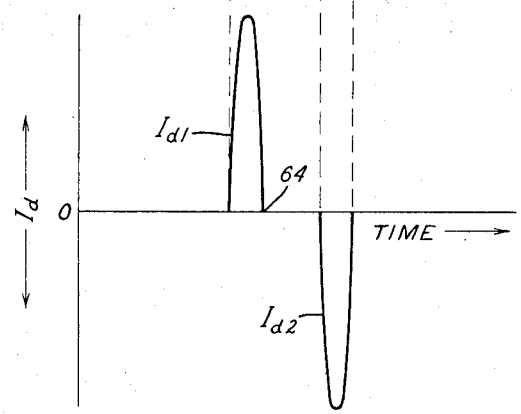
FIG. 3 is a graphic representation of other current relationships present during interruption.

The loop circuit is an oscillatory circuit, the capacitance of which is constituted primarily by capacitor 55 and the inductance of which can be represented by an inductance 60. The discharge current $I_{d1}$ is a relatively high frequency oscillatory current that is superimposed on the current $I_L$ flowing through power line 16. This relationship is illustrated in FIG. 2, where the total current flowing through interrupters 25 is illustrated by the curve $I_t$. When the capacitor 55 initially discharges beginning at an instant 62, the discharge current $I_{d1}$ builds up to a positive peak and then oscillates toward a negative peak, reaching current zero at an instant depicted at 64 in FIG. 3. As will soon be explained, the circuit-making means 58 interrupts the discharge current $I_{d1}$ at this instant 64 and prevents continued flow of the discharge current until the circuit-making means 58 is again closed at a later point, soon to be described.

While the capacitor 55 is discharging following closing of the circuit-making means 58, the voltage appearing across the capacitor is 90 degrees out of phase with the discharge current $I_{d1}$. The effect of the half cycle current $I_{d1}$ on the charge on capacitor 55 is to reverse the polarity of the charge by the time the half cycle is complete. At the current zero point 64, the capacitor charge is of an opposite polarity to that shown in FIG. 1, with the voltage being near its peak value. Thus, by closing circuit-making means 58 and thereafter interrupting the resultant discharge current $I_{d1}$ at the current zero point 64, we have reversed the charge on the commutating capacitor 55. This prepares the capacitor 55 for the actual interrupting operation, soon to be described.

The contacts of interrupters 25 remain closed during the above-described discharge of the commutating capacitor. It is not until a short time afterwards that the contacts of the interrupter 25 are parted. The contact-opening operation is initiated by the electro-responsive control 50. In response to the discharge current $I_{d1}$ flowing through conductor 23, the control 50 actuates the movable disc 52, causing it to open control valve 44. This immediately supplies high pressure fluid to cylinder spaces 35, driving the pistons 34 together, thus rapidly moving contacts 28 out of engagement with contacts 27 to establish a gap between each pair of contacts 27, 28. This draws an arc in each interrupter across the inter-contact gap, through which the load current $I_L$ then passes.

After a period of time that is long enough to assure that movable contacts 28 have reached substantially their fully-open positions, the circuit-making means 58 is closed (at a point 65 in FIG. 2). This again discharges the commutating capacitor 55, causing a current $I_{d2}$ to flow through the above-described loop circuit 56, 27, 28, 23, 28, 27 in a direction opposed to that indicated by arrows 39, passing through interrupters 25 via the arcs then present between contacts 27, 28. This discharge $I_{d2}$ is in an opposite direction to the current $I_L$ flowing through power line 16 and thus acts to drive the total current to zero at the instant 66, as depicted in FIG. 2. Since the contacts are then substantially fully separated, the interrupters 25 are able to recover their dielectric strength sufficiently rapidly after the instant 66 to prevent arc-reignition, thereby completing the interrupting operation.

The normally-open circuit-making means 58 is preferably a triggered vacuum gap device of the general type shown and claimed in U.S. Patent 3,087,092—Lafferty or in application S.N. 580,998—Lafferty, filed Sept. 21, 1966, now Patent No. 3,465,192 both assigned to the assignee of the present invention.

Accordingly, the gap device comprises a pair of spaced main electrodes 80 and 82 disposed in a highly evacuated chamber 84 and defining a main gap 85 therebetween. Disposed adjacent one main electrode 82 is a trigger electrode 86 defined by a metal film on a ceramic support rod 88. This ceramic support rod 88 is disposed coaxially of the main electrode 82 and is suitably sealed to the main electrode 82 about its outer periphery. A portion of the ceramic support rod 88 is uncoated and defines a trigger gap 91 along this uncoated surface that electrically isolates the trigger electrode 86 from the main electrode 42 under normal conditions. A conductive connection 89 extends through the ceramic rod 88 and across its upper end surface to the trigger electrode 86.

When a suitable voltage pulse is applied between the trigger electrode 86 and the main electrode 82, the trigger gap 91 sparks over, and the resultant spark vaporizes a small quantity of the trigger electrode 86. This vapor is quickly ionized and projected into the main gap 85, thus lowering its dielectric strength and initiating a breakdown of the main gap. When the main gap 85 thus breaks down, the commutating capacitor 55 can discharge through the commutating circuit 56 via interrupters 25 and conductor 23 in the manner described hereinabove.

A triggered vacuum device is an ideal type of device for use as the circuit-making means 58 of our circuit breaker because it is capable of being effectively closed (i.e., caused to arc-over) in an extremely short time and also because it is capable of interrupting the resulting current therethrough at the first current zero following arc-over.

The above-described pulse across trigger gap 91 is derived from any suitable conventional pulse source such as schematically shown at 92 connected in a pulse circuit 93, 94 that extends between the trigger electrode and the main electrode. This pulse source 92 is rendered operative to deliver its voltage pulse in response to completion of either of two input circuits 95 and 98. Input circuit 95 is a normally-open circuit that is closed when it is desired to initiate an interrupting operation. It is to be understood that this pulse is a short pulse that is completed well ahead of instant 64 so that the trigger gap 91 has then recovered its dielectric strength and is producing no products which would prevent the desired interruption of the discharge current $I_{d1}$ at 64.

For initiating an interrupting operation, a normally-open overcurrent responsive relay, such as schematically indicated at 96, is provided. When the current in power line 16 exceeds a predetermined value, relay 96 picks up, closing its contacts 96a to complete the input circuit 95 to the pulse source. This initiates an opening operation, as described hereinabove. The opening operation can be initiated at will, instead of in response to an overcurrent, simply by manually closing a switch 97 in parallel with the normally-open contacts 96a of the overcurrent relay 96. This completes the input circuit 95 to initiate an interrupting operation in the same manner as described above.

An important feature of our invention is that the above-described current pulse $I_{d1}$ does not increase the amount of arcing current that the interrupters are required to handle. Since the contacts 27, 28 of the interrupters are closed when this current pulse passes through the interrupters, the increased total current $I_t$ passes through a solid metallic path defined by the closed contacts.

It is only after this current pulse $I_{d1}$ that the contacts 27, 28 are separated to initiate an arc. The current pulse $I_{d2}$ that flows through the interrupters when the circuit-making means 58 is closed a second time drives the arcing current down without increasing it. Hence, when the current zero point 66 has been reached, the interrupter has not been subjected to extreme high arcing currents and is thus more capable of recovering its dielectric strength to complete the interrupting operation.

For closing the circuit-making means 58 a second time, as described above, the input circuit 98 to the pulse source 92 is relied upon. This is a normally-open circuit which, when completed, causes the pulse source 92 to deliver a voltage pulse to trigger gap 91. This input circuit 98 is completed by the closing of a control switch 97 when the movable contact 28 of one of the vacuum interrupters reaches a predetermined point in its opening stroke.

For charging the commutating capacitor 55, we rely upon the charging means disclosed and claimed in the aforementioned Greenwood application S.N. 533,366. In this charging means, the commutating capacitor 55 is charged directly from the power lines 16, 19 without relying on a separate charging source. In this regard, the commutating capacitor is connected to the power line 16 at the source side of the interrupters 25, and a charging circuit 100 is connected between the juncture of capacitor 55 and the circuit-making means 58 and the return conductor 19 of the power circuit. Capacitor 55 is always connected to the source side of the D-C circuit, even when the circuit-making means 58 is opened.

The charging circuit 100 comprises a resistance 102 of a relatively high value. Irrespective of whether the interrupters 25 are closed or opened, the charging circuit 100 connects the series combination of the commutating capacitor 55 and the resistor 100 across the terminals of source 12. As a result of this connection, source 12 can charge capacitor 55 to full line voltage with a charge of the polarity shown in FIG. 1 whether the interrupters 25 are open or closed (assuming circuit-making means 58 is open).

Since the commutating capacitor 55 is charged from source 12 when interrupters 25 are open, it is possible to close interrupters 25 with assurance that the interrupters can immediately open to interrupt the circuit should this be necessary, say as a result of a fault being present.

Utilizing the charging means of the Greenwood application has the important advantage of permitting charging to be effected directly from the power line 16 without requiring a separate charging source. But a disadvantage that has heretofore been encountered in using the Greenwood charging circuit is that the circuit breaker was required to handle increased arcing currents since arcing was initiated before the commutating capacitor was discharged, and the current pulse $I_{d1}$ passed through the interrupters as arcing current. This meant that the interrupters were required to handle a peak arcing current equal to the peak current $I_t$ of FIG. 2. But we are able to overcome this problem, first of all, because we force the discharge current $I_{d1}$ through the interrupter before the contacts separate. The discharge current $I_{d2}$ that flows after the contacts have separated does not increase the arcing current but acts only to drive it down to current zero. Secondly, by interrupting the discharge current (at 64) and delaying its resumption until the contacts are almost fully separated, we can assure that the interrupters will be in a condition to interrupt the circuit when the current zero point 66 is reached.

Another important advantage of our circuit breaker is its ability to achieve extremely rapid contact separation. In order to assure interruption of a fault current at the current zero point 66, it is important that substantially the full contact-separation be achieved before this instant. While the time preceding this instant can be controlled by postponing the instant at which the circuit-making means 58 is fired the second time, very little delay in this second firing can be tolerated. This is the case because the D-C current is continuing to grow in magnitude, and increasingly greater values of inductive energy must be dissipated the longer current zero is postponed.

The required mechanical response is on the order of

.004 second from the initial decision to trip the breaker until the contacts are fully parted. This is an extremely short time compared even to the time required for conventional high-speed high voltage circuit breakers. Because of the extremely short time requirements, conventional mechanical release schemes are not adequate, primarily because they involve long insulating rods which incur serious penalties in wave transmission time and added mass.

Our scheme overcomes these problems by effectively utilizing the first half cycle pulse $I_{d1}$ of the capacitor discharge current to initiate a contact-opening operation. In this respect, this current pulse is caused to pass through an actuating coil 51 which is at the same potential as the interrupters 25. Since both the actuating coil 51 and the control valve 44 are at substantially line potential, they can be mechanically connected together with a short metal rod 105. There is no need for a long insulating rod which is required to withstand a substantial portion of the voltages present.

Figure 4:
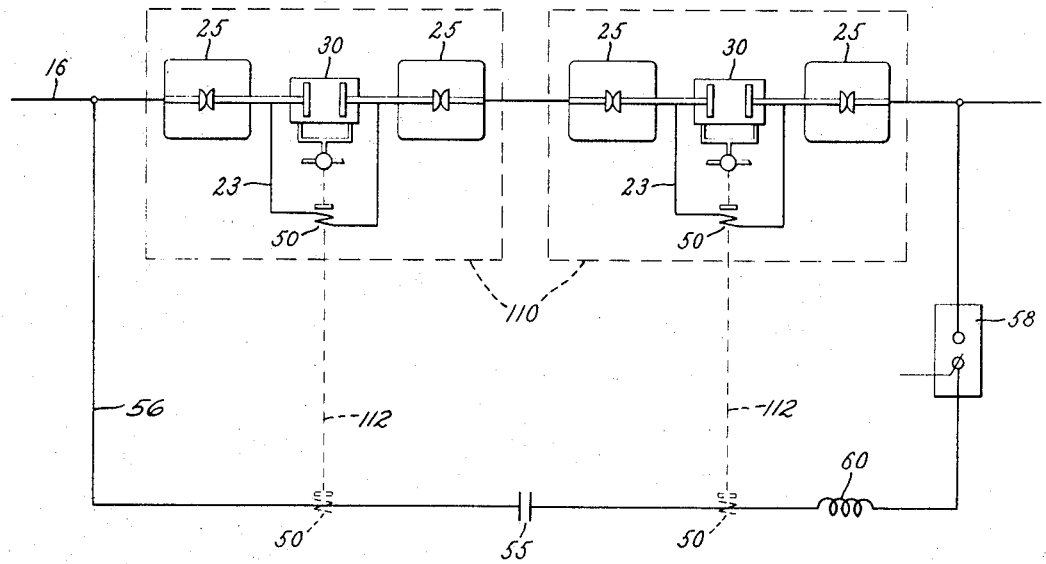
FIG. 4 is a schematic diagram of a modified form of the invention.

In high voltage applications, where there are a large number of interrupters electrically conected in series, it has been customary either (1) to mechanically connect the interrupters together with long insulating rods and to operate them by a single operator or (2) to provide separate operators having their controls mechanically connected together through long insulating rods. In the present arrangement, we are able to obviate the need for these long insulating rods (1) by providing separate operators for each interrupter or each pair of interrupters, (2) by providing an electrical control 50 immediately adjacent each operator, and (3) by passing the electrical pulse $I_{d1}$ through the controls 50 to initiate the circuit-breaker opening operation. FIG. 4 shows how the invention is applied to a circuit breaker that comprises four interrupters 25 in series. Each pair of interrupters and its control may be thought of as constituting a module 110. These modules 110 are shown connected in series. If more interrupters are needed to handle higher voltages, additional modules are added and connected in series with those shown. The current pulse $I_{d1}$ passes through the control 50 for each of these modules upon initial discharge of the commutating capacitor. When the circuit breaker is open, the controls 50 are electrically isolated from each other by the open interrupters which are disposed electrically between the controls.

While it is possible to provide an arrangement in which the trip signal is transmitted from a signal source to each control through a separate transmission channel that is able to maintain electrical isolation between the controls and signal source, e.g., a radio or light signal transmission channel, it is to be noted that we do not require any such added transmission channels in our arrangement. The trip signal is transmitted to the operators through existing electrical circuitry 16, 23 that is already present and is otherwise needed.

In lower voltage applications, we prefer to locate the tripping controls 50 in the commutating circuit 56 rather than in the main power circuit 16, 23. Tripping controls 50 that are so located are shown in dotted line form in FIG. 4. An advantage of so locating the tripping controls 50 is that the tripping controls coils are not required to carry the line current $I_L$. This permits a more compact and efficient design of each of the tripping controls. But a disadvantage of locating the tripping controls 50 in commutating circuit 56 is that a substantial voltage is sometimes present between the tripping control and the valve 44, necessitating that the rod 112 mechanically connecting these parts be relatively long and of insulating material in order to withstand the voltages involved. This detracts from available operating speeds, as pointed out hereinabove. For lower voltage applications, this rod does not need to be very long and its presence therefore does not seriously detract from the speed of operation. But for higher voltage applications, it becomes quite long, and we prefer to locate the control 50 in the power circuit 16, 23, as shown in FIGS. 4 and 1.

Although we have shown a control 50 which directly operates the opening control valve 44, it is to be understood that a suitable separate energy source for each control valve 44 could be provided and the control relied upon merely to trigger the source into high speed operation of the control valve.

While we prefer to use a control 50 that relies upon repulsion forces as above described, it is to be understood that other types of electroresponsive controls could be used instead, e.g., a suitable solenoid type control that is restrained from operating under normal current conditions but which operates in response to the current pulse $I_{d1}$ of FIG. 2.

While the illustrated circuit-making means 58 is constituted by only a single triggered vacuum gap, it is to be understood that in high voltage applications, a plurality of these gaps, connected in series and for substantially simultaneous operation, will be used.

While we have shown and described particular embodiments of our invention, it will be obvious to those skilled in the art that various changes and modifications may be made without departing from the invention in its broader aspects; and we, therefore, intend in the appended claims to cover all such changes and modifications as fall within the true spirit and scope of our invention.

What we claim as new and desire to secure by Letters Patent of the United States is:

1. Means for interrupting a high voltage D-C circuit comprising:
    (a) an interrupter comprising a pair of separable contacts for connection with said D-C circuit,
    (b) means for normally maintaining said contacts in engagement to enable direct current in said circuit to flow therethrough,
    (c) a normally-open commutating circuit connected across said contacts and comprising normally-open circuit-making means and a commutating capacitor connected in series relationship with each other when said circuit-making means is closed,
    (d) said commutating capacitor being connected to said D-C circuit at the source side of said contacts even when said circuit-making means is open,
    (e) means operable both when said contacts are engaged and disengaged for causing said capacitor to be charged from said D-C circuit when said circuit-making means is open,
    (f) means for closing said circuit-making means while said contacts are still engaged to discharge said commutating capacitor through said engaged contacts and said circuit-making means and cause said commutating capacitor to be charged with a polarity opposite its initial charge, the initial discharge current passing through said contacts in the same direction as the direct current in said D-C circuit,
    (g) means for interrupting the capacitor discharge current through said circuit-making means when said discharge current oscillates to zero,
    (h) means for separating said contacts following initial discharge of said commutating capacitor,
    (i) and means for again closing said circuit-making means after said contacts have been separated a predetermined distance, thereby discharging said capacitor through said interrupter in an opposite direction to the direction of its initial discharge, thus driving the current through said D-C circuit to zero.

2. The apparatus of claim 1 in which said means for separating said contacts comprises means responsive to the initial discharge of said commutating capacitor for initiating a contact-separating operation.

3. The apparatus of claim 2 in which said means responsive to said initial capacitor-discharge comprises a component effectively connected in series with said interrupter.

4. The apparatus of claim 2 in which said means responsive to said initial capacitor-discharge comprises a component connected in said normally-open commutating circuit so that direct current in said power circuit does not normally pass therethrough.

5. The apparatus of claim 1 in which said circuit-making means comprises a triggered vacuum gap device, which also serves to interrupt the capacitor discharge current upon its oscillation to zero.

6. The apparatus of claim 1 in which:
 (a) said circuit-making means comprises a triggered vacuum arcing device comprising a pair of electrodes defining a main gap therebetween and means defining a trigger gap near said main gap, said main gap being adapted to spark-over in response to a spark-over of said trigger gap, and
 (b) said means for closing said circuit-making means comprises means for sparking-over said trigger gap.

7. The apparatus of claim 1 in which said contacts are caused to part after said discharge current has been interrupted and before said circuit-making means is closed as specified in (i) of claim 1 to discharge said capacitor in said opposite direction.

8. The apparatus of claim 1 in which said contacts are caused to part after said initial discharge current has passed through its peak and before said circuit-making means is closed as specified in (i) of claim 1.

9. The apparatus of claim 1 in which said capacitor-charging means of (e) comprises resistance means connected between the juncture of said capacitor and said circuit-making means and the return conductor of said D-C circuit.

10. Means for interrupting a high voltage D-C circuit comprising:
 (a) an interrupter comprising a pair of separable contacts for connection in series with said D-C circuit,
 (b) means for normally maintaining said contacts in engagement to enable direct current in said circuit to flow therethrough,
 (c) a normally-open commutating circuit connected across said contacts and comprising normally-open circuit-making means and a commutating capacitor connected in series relationship with each other when said circuit-making means is closed,
 (d) said commutating capacitor being connected to said D-C circuit at the source side of said contacts even when said circuit-making means is open,
 (e) means operable both when said contacts are engaged and disengaged for causing said capacitor to be charged from said D-C circuit when said circuit-making means is open,
 (f) means for closing said circuit-making means while said contacts are still engaged to effect a reversal in the polarity of the charge on said capacitor,
 (g) means for separating said contacts following said charge reversal,
 (h) means for maintaining said reverse charge on said capacitor until said contacts have separated a predetermined distance,
 (i) and means for again closing said circuit-making means after said contacts have been separated said predetermined distance, thereby discharging said capacitor initially in a direction to drive said direct current toward zero.

11. Means for interrupting a high voltage D.C. circuit comprising:
 (a) a plurality of interrupters each comprising separable contacts for connection in series in said D.C. circuit,
 (b) means for normally maintaining said contacts in engagement to enable direct current in said circuit to flow therethrough,
 (c) a plurality of trip-controlling components for said interrupters effectively connected in series with said D.C. circuit and located between electrically adjacent interrupters,
 (d) contact-separating means for separating said contacts in response to operation of said trip-controlling components,
 (e) said trip-controlling components being operable in response to a predetermined pulse of current passing therethrough to cause said contact-separating means to initiate separation of said contacts,
 (f) and trip-initiating means for superimposing on the D.C. current flowing through said contacts a pulse of current effective to operate said trip-controlling components.

12. The circuit interrupting means of claim 1 in which:
 (a) said trip-controlling components are essentially nonresponsive to steady-state direct current passing therethrough and are operable in response to a rapidly-changing current passing therethrough, and
 (b) the pulse of current superimposed on said D.C. current by said trip-initiating means constitutes a rapidly-changing current that is effective to cause operation of said trip-controlling components.

References Cited

UNITED STATES PATENTS 3,227,924  1/1966  Wutz _____ 317—11
3,435,288  3/1969  Greenwood _____ 317—11

WILLIAM M. SHOOP, JR., Primary Examiner

H. FENDELMAN, Assistant Examiner

U.S. Cl. X.R.
307—136; 317—59